Feb. 2, 1971  G. W. STILLEY ET AL  3,560,183
BENDING GLASS SHEETS

Filed Sept. 13, 1968  2 Sheets-Sheet 1

INVENTORS
GEORGE W. STILLEY
JOHN A. COMPERATORE
BY
Chisholm and Spencer
ATTORNEYS

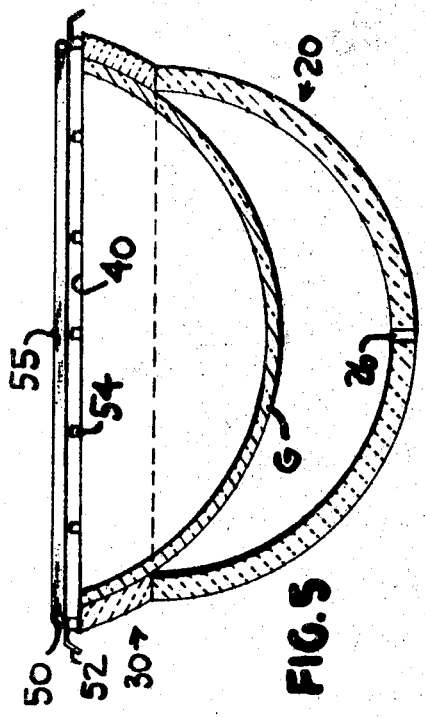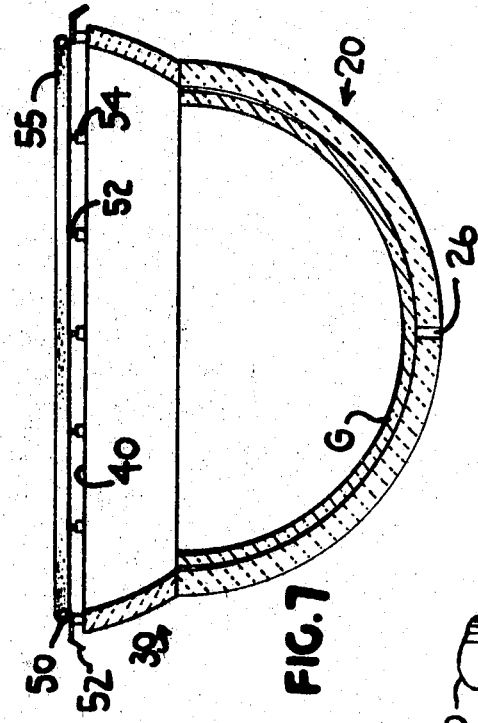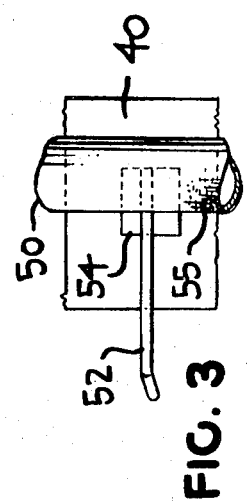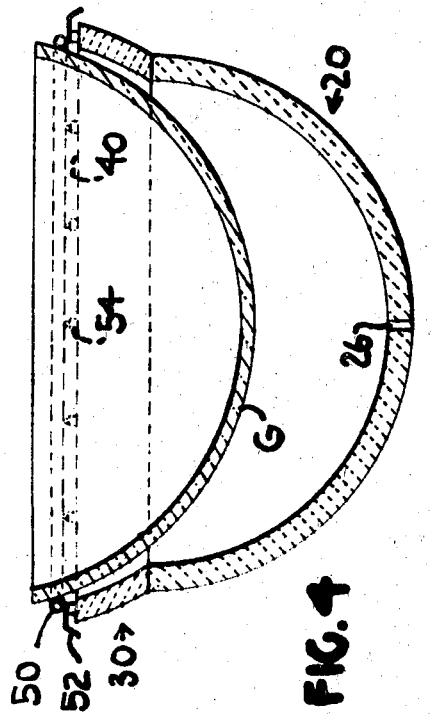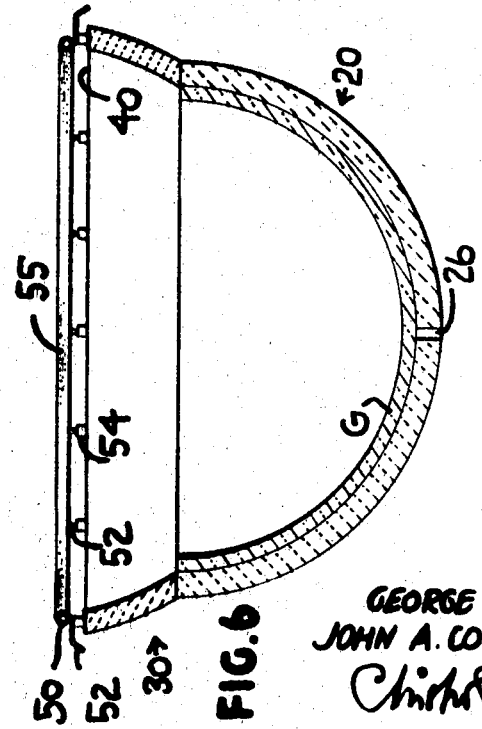

3,560,183
BENDING GLASS SHEETS
George W. Stilley, Freeport, and John A. Comperatore, Natrona Heights, Pa., assignors to PPG Industries, Inc., Pittsburgh, Pa., a corporation of Pennsylvania
Filed Sept. 13, 1968, Ser. No. 759,602
Int. Cl. C03b 23/02
U.S. Cl. 65—107    3 Claims

ABSTRACT OF THE DISCLOSURE

Bending thick glass into hemispherical shapes comprising using a mold of concave elevation of material having less thermal expansivity than glass, said mold comprising a ring of rigid material having greater thermal expansivity than glass and sufficiently smaller in diameter than the mold at glass loading temperature to support the glass over said mold at the temperature at which the mold is loaded and capable of expanding sufficiently more rapidly than the mold to deposit the glass onto the mold after the glass has attained a sufficiently high temperature to deform in response to external stresses.

---

This invention relates to Bending Glass Sheets and particularly relates to a method and apparatus for bending glass sheets into spherical shapes suitable for use in deep submergence spheres.

The shaping of glass sheets by heat-sagging is well known. Glass sheets are heated to deformation temperature (about 1080 degrees Fahrenheit for commercial plate glass ¼ inch thick to about 1230 degrees Fahrenheit for the same glass composition in sheets 1½ inch thick) until the heated glass sheet sags by gravity to conform to a curved shape. The present invention makes effective use of heat-sagging to bend thick glass sheets (having a thickness of about 1½ inches initially) into hemispherical shapes for use in deep submergence spheres for studying the seas at great depths below sea level. Such spheres are suitable for receiving instruments and/or personnel within the sphere to study various conditions of the ocean at various levels.

Glass sheets formed into hemispheres in this manner have a mass approximating 700 pounds. Such hemispheres of 56 inch nominal diameter usually require flat discs of 80 inch diameter and 1½ inch thick to produce the ultimate hemispheres having a thickness in the range of 1¾ inch to 1⅞ inch and a nominal diameter of 56 inches.

According to prior art technology, a flat glass sheet is initially bent into an intermediate shape where it forms a spherical section (less than a hemisphere) of a sphere having a nominal diameter of approximately 64 inches. This partially bent glass sheet is then mounted in bending relation to a hemispherical mold of concave elevation having the requisite curvature for the finally bent glass sheet.

In attempting to bend these massive glass shapes, no substantial trouble was met in bending the flat glass to the intermediate shape. However, considerable breakage occurred when a glass sheet of intermediate curvature was bent on a mold provided with an upward facing shaping surface of hemispherical configuration having a diameter equal to the ultimate diameter desired for the glass and an upper mold portion formed of a spherical section whose shape varied from a diameter substantially equal to the intermediate shape of the glass in its upper portion to a lower portion having the diameter of the ultimate shape desired.

The present invention attributes this breakage during the sag bending from intermediate curvature to ultimate curvature to the stress imposed on the glass sheet durring its heating before the glass reaches its strain point. The present invention attributes this stress to the fact that the glass expands more rapidly than the mold during the heating step. Since the outer perimeter of the glass extends obliquely upward at a small angle to the plane at the margin of the hemispherical mold, the greater expansion of the glass compared to that of the mold is transmitted to the fragile glass as a fracturing stress. The mass of the glass cooperates with the horizontal force due to the more rapid expansion of the glass than the mold to produce a resultant force that wedges the glass against the mold. As long as the glass is below its strain point, this resultant wedging force stresses the glass to cause fracture.

One technique to avoid this fracturing stress would be to maintain the glass temperature at approximately its strain point at least during its transfer from the intermediate shape mold to the final mold. However, it is difficult to handle sheets and molds at strain point temperature and hotter without distorting the heat-softened glass. Therefore, the present invention was devised to save expensive masses of glass bent to intermediate curvature from breakage during their final shaping.

It is noted in passing that this breakage does not occur when flat glass is bent by sagging into a spherical section onto the shaping surface of a mold of concave elevation. This absence of breakage in the bending from flat to curved configuration is associated with the lack of a wedging action before the glass is heated to at least its strain point.

According to the present invention, the glass is initially supported above the mold on a rigid annular member having a diameter slightly less than that of the glass at the temperature at which the glass is mounted for bending with its entire periphery supported approximately equidistantly outward of the inner end of said rigid annular member. The annular member has a thermal expansion coefficient greater than that of the glass undergoing bending, so that when the glass attains a temperature at which it is readily deformable, the annular member expands to a diameter greater than that of the heated glass, thereby depositing the deformable glass sheet onto the conventional mold having a thermal expansion coefficient less than that of the glass. Thus, the present invention keeps the glass out of mold contact while it is rigid and avoids the wedging force that stresses the rigid glass into fracture and postpones glass to mold contact until the time the glass is heated to a temperature at which it is readily deformed.

Apparatus according to the present invention for accomplishing the above desired goal comprises an annular member having a thermal expansion coefficient greater than that of glass superimposed on the upper portion of a mold of concave elevation having a thermal expansion coefficient less than that of glass. At the temperature at which the mold is loaded, the annular member has a diameter sufficiently smaller than that of the partially bent glass to support the glass below its margin.

As the mold and glass are heated to the glass softening point to promote sagging of the glass toward the shaping surface of the hemispherical mold, the annular member expands more rapidly than the mold and the dimensions of the annular member and the mold are so related to each other that, when the glass reaches the annealing range of temperatures, the glass is deposited onto the mold. At these elevated temperatures, the glass is capable of distorting in response to the external forces applied by the mold shaping surface onto the glass and the glass sags into conformance with the mold shaping surface at the glass softening temperature rather than developing tension stresses due to the wedging force developed.

After the glass obtains its desired shape, the glass is annealed by cooling both the glass and the mold at controlled rates. The glass, having a higher coefficient of thermal expansion than the mold, contracts away from the mold during this cooling, thus facilitating removal of the cooled, bent hemisphere from the mold. Of course, both the annular member and the mold are composed of materials inherently capable of withstanding repeated temperature cycling between room temperature and the glass softening point, as will become obvious from the materials recited hereinbelow in the description of an illustrative preferred embodiment.

A preferred embodiment of the present invention will be described in order to complete the disclosure of the invention. In the drawings forming part of the present invention and wherein like reference numbers refer to like structural elements:

FIG. 3 is a fragmentary sectional view along the lines III—III of FIG. 2; and

FIGS. 4, 5, 6 and 7 are diagrammatic views showing different stages of a typical bending and annealing operation utilizing a mold modified according to the teachings of the present invention.

Figure 1:
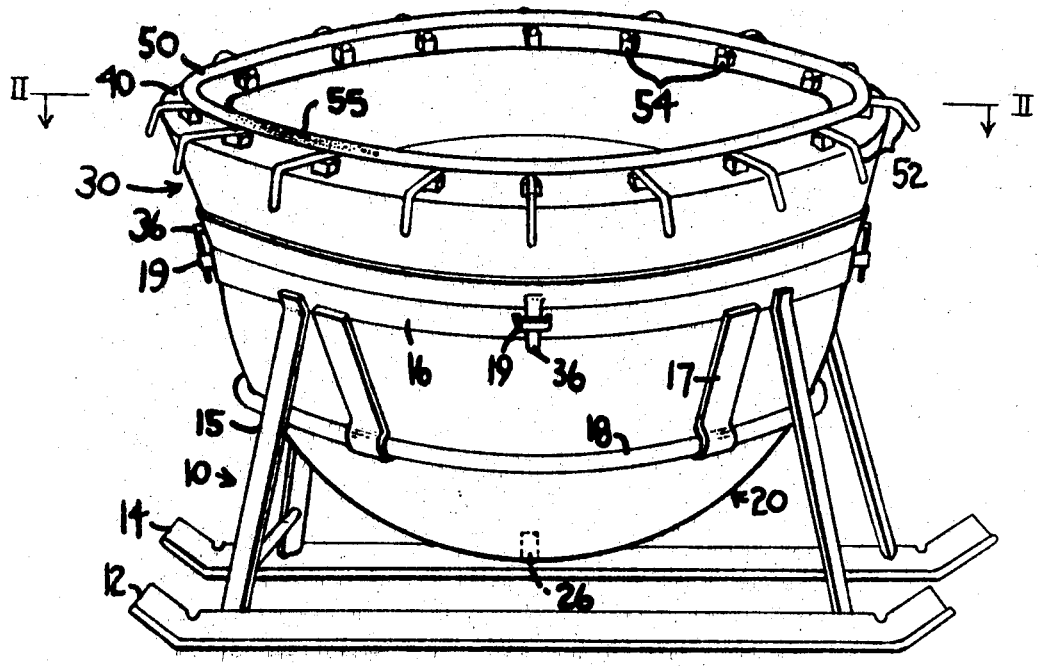
FIG. 1 is a perspective view of said illustrative embodiment.
Figure 2:
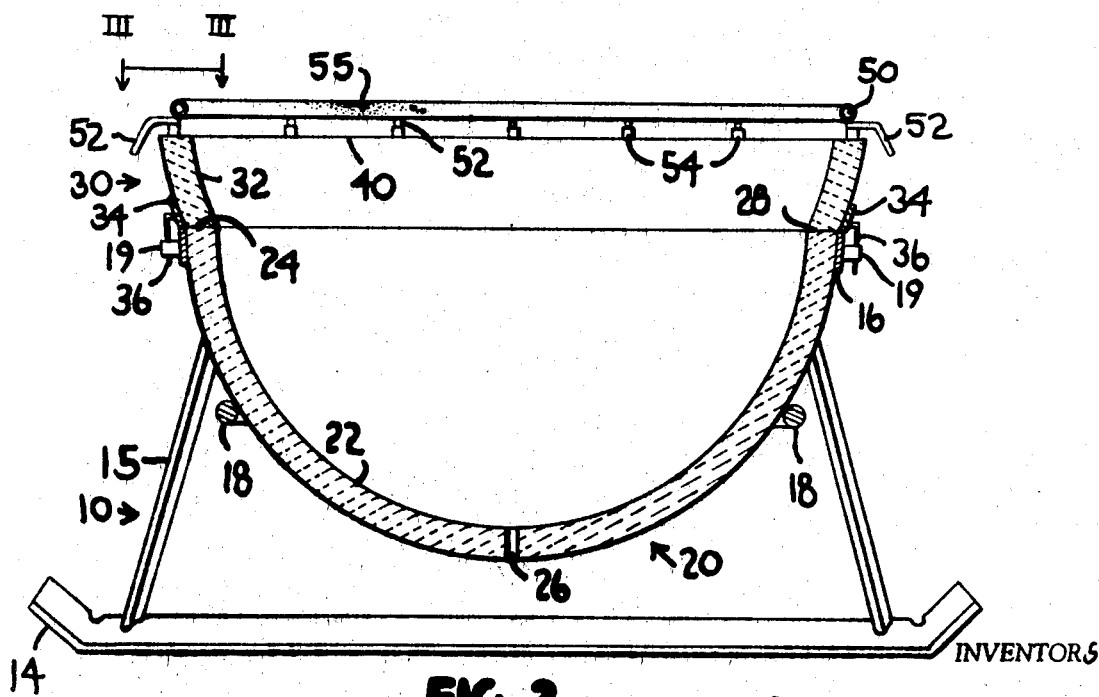
FIG. 2 is a sectional view in elevation of the apparatus depicted in FIG. 1.

Referring to the drawings, the mold is mounted on a mold support structure 10 comprising a pair of horizontally extending elongated rails 12 and 14. A pair of braces 15 extend upward from each of the shaping rails in obliquely upward and inward direction with their upper ends connected to a peripheral ring 16 which engages the outer perimeter of a lower hemispherical mold section 20 just below its equator. The glass supporting carriage 10 also includes connecting members 17 which extend downward from ring 16 to a lower ring 18. The rings 16 and 18 and connecting members 17 form a metal reinforcing frame for the lower mold section 20. The upper ring 16 has brackets 19 welded thereto around its periphery.

The lower mold section 20 is constructed of a castable aluminum oxide refractory consisting essentially of about 93 percent by weight of a grog of tabular alumina aggregate (aluminum oxide), about 5 percent calcium oxide, 1 percent iron oxide and about 1 percent silica, magnesia, sodium oxide and impurities. Such a material is sold commercially under the trade name "Puro-tab" castable by Kaiser Refractories Corporation of Oakland, Calif., inherently capable of withstanding repeated temperature cycling.

The lower mold section 20 is about 3 inches thick and has an upward facing suface 22 in the form of a hemisphere. Its upper edge surface 24 is in the equitorial plane of the hemisphere and forms a ring three inches wide having an inner diameter of 56 inches at room temperature. It has an aperature 26 at the lowest portion of its shaping surface to permit the escape of air that would otherwise be entrapped between the sagging glass and the mold shaping surface 22. Preferably, aperture 26 has a diameter of about ¼ inch. A layer 28 of a soft flexible refractory material such as asbestos and the like rests on the upper edge surface 24. A suitable material for this layer 28 is sold under the trade name of Fiberfrax.

A spherical upper mold section 30 provided with an upward facing surface 32 of a ceramic material capable of withstanding repeated temperature cycling is reinforced by a ring 34 surrounding its outer surface. The ring 34 has a plurality of depending fingers 36 extending downward. Each of the fingers 36 is loosely received in a different bracket 19 around the periphery of the ring 16 of the mold support structure 10. The upper mold section 30 is also approximately 3 inches thick and extends obliquely upward and outward from its bottom edge, which rests on the layer 28 superimposed on the upper edge surface 24 of the spherical lower mold section 20. The lower edge surface of the mold section 30 has an inner diameter of 56 inches at room temperature to conform with the 56 inch inner diameter of the hemispherical lower mold section 20. The upward facing surface 32 of the upper mold section 30 has a radius of 32 inches at room temperature. The shaping surface 32 extends arcuately upward for a height of about 10 inches and terminates at its upper end in an upper edge surface 40 that is about 3 inches wide.

According to the present invention, an annular ring 50, preferably of type 304 stainless steel in the form of a 1½ inch outer diameter pipe having a ⅛ inch wall, is provided in sliding relation on the upper edge surface 40 of the upper mold section 30. The pipe is formed at room temperature to have a circumference about 2 inches less than the circumference of the upper edge surface 40 at room temperature. At spaced intervals along the circumference of the ring, tabs 52 are welded to the bottom tangent of its bottom surface. These tabs are preferably of the same metal as the ring, are ⅛ inch thick, 1 inch wide and about 7 inches long and are bent downward in a radially outward direction in the manner shown. A shim 54 of metal ½ inch thick, 1 inch long and ½ inch wide is welded to the bottom of each of the tabs 52. Therefore, the annular member 50 rests in spaced relation to the edge surface 40 with its tab and shim separating the ring from direct contact with the upper edge surface 40 of the upper mold section 30. Preferably, a tape of woven fiberglass is wound about the metal ring with overlapping windings to avoid having the glass come into direct contact with the metal at elevated temperatures.

In FIG. 4, the mold and its supported ring is below the annealing range of the glass so that the annular member 50 has a diameter less than that of the upper mold spherical section 30 and the partially bent glass G mounted on the modified mold for sag bending. Therefore, the glass rests on the annular member 50 slightly below the uppermost edge of the glass and is spaced from the upper mold section 30 during initial mounting. The downwardly bent exterior portions of the tabs 52 guide the positioning of the annular member 50 around the upper edge of mold section 30 when the ring 50 is contracted to a diameter less than that of mold section 30 at room temperature.

As the glass and the mold are heated, the annular member 50 expands more rapidly than the mold. It also expands more rapidly than the glass so that by the time the glass reaches a temperature of about 1100 degrees Fahrenheit, the glass slides gradually from support by the annular member 50 to support by the upper mold section 30, as depicted in FIG. 5. Note that the downwardly bent outer portions of the tabs 52 are now spaced outward from the mold section 30 more than in FIG. 4 as the thermal expansion of the ring 50 moves these tabs radially outward.

As the heating continues to still higher temperatures, the glass sags further and its softness permits it to deform into conformance with the spherical shape of the shaping surface 22 of the spherical mold 20. This is shown in FIG. 6.

When the glass and mold are cooled to anneal the bent glass, the glass contracts more rapidly than the mold, as seen in FIG. 7, to help remove the glass from the mold. The aperture 26 may be used to force air upward to help lift the bent, annealed glass from the mold. A vacuum cup is used to lift the bent glass from the mold.

The ring 50 does not disturb the removal of the bent glass because the diameter of the glass hemisphere so produced is 8 inches less than the maximum diameter of the hemispherical section mounted on the ring for bending. Thus, the glass diameter is reduced by shaping more than the ring contracts on cooling and the glass hemisphere, on attaining its hemispherical shape, is readily removed from the mold without disturbing the ring.

Occasionally, a glass sheet is removed before it reaches the mold shaping surface. Consequently, it must be reheated to complete the bend. Under such circumstances, the upper mold section 30 is removed and a ring similar to ring 50 is mounted on the upper edge surface 24 of the mold 20. The ring so mounted has a diameter slightly less than the 56 inch diameter of the hemisphere formed on the upward facing shaping surface at room temperature and expands more rapidly than the glass and mold to deposit the glass onto the mold shaping surface 22 as heating takes place. However, when the properly bent glass is cooled, the ring must be removed in this case before the bent glass can be removed from the mold.

In a typical bending operation prior to the present invention, a glass sheet of soda-lime-silica glass having a coefficient of thermal expansion of $8.5 \times 10^{-6}$ per degree Fahrenheit in the form of a spherical section of a sphere 64 inches in diameter with its upper edge resting on an upper mold portion of a cast alumina body having a thermal expansion coefficient of $4.3 \times 10^{-6}$ per degree Fahrenheit in the form of a hemispherical section, fractured on its outside surface when heating. Adding a ring of 304 stainless steel pipe having a thermal expansion coefficient of $10.4 \times 10^{-6}$ per degree Fahrenheit to support the glass spherical section out of mold contact and arranging the ring to have a circumference at room temperature about 2 inches less than that of the upper edge of the upper mold portion enabled the ring to expand sufficiently more rapidly than the glass and the mold to deposit the glass onto the mold at a temperature above the annealing range of the glass. At this temperature, the relatively soft glass deformed on contact with the rigid mold without developing a wedging stress, and breakage was avoided.

Any rigid material having the ability to withstand repeated temperature cycling needed for glass bending without softening may be used to support the glass above the mold provided it is smaller than the glass at the temperature at which the glass is loaded onto the mold and the material has a thermal expansion coefficient greater than that of glass by an amount such that it becomes larger than the glass at a temperature below the melting point of the glass and above its strain point. A ring that transfers the glass from a rigid support to the mold within the proper temperature range is suitable for performing the present invention.

It is understood that if the rigid support has a thermal expansion coefficient that differs from that of the glass by too much, that the ring must be sufficiently shorter than the glass perimeter at loading temperature to enable the transfer to take place at the proper glass temperature. Alternatively, if the difference in thermal expansion coefficient between the rigid supporting ring and the glass is too little, the ring diameter must be only slightly greater than that of the upper edge of the glass undergoing bending to insure transfer of the glass to the mold at the proper temperature.

What is claimed is:

1. In the method of shaping a massive glass sheet into conformity with a shaping surface of concave elevation formed on a mold having a thermal expansion coefficient less than that of said glass by heating said glass sheet to its deformation temperature and sagging the heat-softened glass sheet until it makes substantially continuous contact with said shaping surface, the improvement comprising initially supporting said glass sheet adjacent its periphery above said mold on a rigid support sufficiently small to support said glass sheet and having a thermal expansion coefficient sufficiently greater than that of said glass to expand to a greater size than that of said glass sheet when said sheet and support are heated from room temperature to the glass deformation temperature, heating said glass sheet and said support until said glass sheet is readily deformable and said support expands to a size greater than that of said glass sheet and is beyond the periphery thereof whereby said sheet is no longer supported by said rigid support, to deposit the heated glass by gravity from said rigid support to said mold when the glass is readily deformable to conform readily to the shape of said shaping surface on further heat sagging.

2. The improvement according to claim 1 wherein said sheet is initially supported with its entire periphery supported approximately equidistantly outward of the inner end of said rigid support and said deposit by gravity is accomplished by expanding said rigid support thermally to a size greater than said glass sheet when said glass sheet reaches a temperature above its strain point during said heating while said support is superimposed over said mold, thereby lowering said glass sheet by gravity onto said mold when said glass sheet is sufficiently hot to be readily deformed.

3. A mold for supporting a massive glass sheet during its shaping into a spherical section comprising:
    (1) an annular member of a rigid material capable of withstanding temperature cycles between room temperature and glass softening temperature and having a coefficient of thermal expansion greater than that of said glass sheet and having a diameter at room temperature less than that of the glass sheet to be shaped and greater than that of said glass sheet at a temperature above the annealing range of said glass,
    (2) an upper mold section having an upper edge surface comprising a ceramic material capable of withstanding said temperature cycles and having a coefficient of thermal expansion less than that of said glass sheet and having an upward facing surface formed thereon having a diameter approximating that of said annular member when the mold temperature is within the annealing range of said glass,
    (3) a lower mold section having an upper edge surface comprising a ceramic material capable of withstanding said temperature cycling and having an upward surface formed thereon having a diameter desired for the shaped glass sheet, means for attaching said upper mold section to said lower mold section at the upper edge surface of said lower mold section and means on the upper edge surface of said upper mold section for permitting said annular member to expand and contract radially relative to said mold portions in response to changes in said temperature cycles.

References Cited

UNITED STATES PATENTS

| | | | |
|---|---|---|---|
| 682,571 | 9/1901 | Sage | 65—287 |
| 3,414,395 | 12/1968 | Reese et al. | 65—107 |

S. LEON BASHORE, Primary Examiner

S. R. FRIEDMAN, Assistant Examiner

U.S. Cl. X.R.

65—289